United States Patent
Klyza

(10) Patent No.: US 9,841,049 B2
(45) Date of Patent: Dec. 12, 2017

(54) LOAD TRANSFER POINT OFFSET OF ROCKING JOURNAL WRISTPINS IN UNIFLOW-SCAVENGED, OPPOSED-PISTON ENGINES WITH PHASED CRANKSHAFTS

(71) Applicant: ACHATES POWER, INC., San Diego, CA (US)

(72) Inventor: Clark A. Klyza, San Diego, CA (US)

(73) Assignee: ACHATES POWER, INC., San Diego, CA (US)

(*) Notice: Subject to any disclaimer, the term of this patent is extended or adjusted under 35 U.S.C. 154(b) by 171 days.

(21) Appl. No.: 14/732,588

(22) Filed: Jun. 5, 2015

(65) Prior Publication Data

US 2016/0356216 A1 Dec. 8, 2016

(51) Int. Cl.
| | | |
|---|---|---|
| *F16C 9/04* | (2006.01) | |
| *F16C 3/06* | (2006.01) | |
| *F02B 75/28* | (2006.01) | |
| *F16J 1/16* | (2006.01) | |
| *F16C 17/24* | (2006.01) | |
| *F01B 7/02* | (2006.01) | |

(52) U.S. Cl.
CPC ............... *F16C 9/04* (2013.01); *F01B 7/02* (2013.01); *F02B 75/282* (2013.01); *F16C 3/06* (2013.01); *F16C 17/24* (2013.01); *F16J 1/16* (2013.01); *F16C 2361/00* (2013.01)

(58) Field of Classification Search
CPC ......... F01B 7/02; F16J 1/16; F16J 1/14; F16J 7/00; F01M 1/06; F01M 2001/066; F01M 2001/062; F01M 2011/026; F01M 2011/027; F01M 2011/028; F04B 53/146; F02B 75/28; F02B 25/08; F02B 75/18; F16N 13/02

USPC .......... 123/52.1–52.3, 52.5, 53.3–53.6, 55.2, 123/55.4–55.7, 58.1, 197.3, 197.4, 587, 123/594

See application file for complete search history.

(56) References Cited

U.S. PATENT DOCUMENTS

| | | | | |
|---|---|---|---|---|
| 2,473,759 A | * | 6/1949 | Mallory ................... | F01B 7/14 123/51 BA |
| 2,608,964 A | * | 9/1952 | Mallory ................... | F01B 7/14 123/51 BA |
| 2,757,990 A | * | 8/1956 | Barlow ..................... | F16J 1/14 384/155 |
| 2,840,060 A | * | 6/1958 | Johansson ................ | F01B 7/14 123/197.4 |

(Continued)

OTHER PUBLICATIONS

International Search Report and Written Opinion dated Sep. 23, 2016, for PCT application No. PCT/US2016/033823.

*Primary Examiner* — Hung Q Nguyen
*Assistant Examiner* — Tea Holbrook
(74) *Attorney, Agent, or Firm* — Terrance A. Meador

(57) ABSTRACT

Load transfer point offset of rocking journal bearings in uniflow-scavenged, opposed-piston engines with phased crankshafts includes differing offsets for the load transfer points of opposed pistons. More specifically, under the condition that a first crankshaft leads the second crankshaft, an angular offset of a rocking journal wristpin of a piston coupled to the first crankshaft proportional to an offset of the first crankshaft relative to the second crankshaft is made to ensure adequate oil film thickness to the wristpin when it experiences a peak combustion pressure during a power stroke.

13 Claims, 8 Drawing Sheets

(56) References Cited

U.S. PATENT DOCUMENTS

| | | | | |
|---|---|---|---|---|
| 3,485,221 | A * | 12/1969 | Feeback | F01B 7/14 |
| | | | | 123/51 AA |
| 3,762,389 | A | 10/1973 | Malina | 123/197 |
| 4,010,611 | A * | 3/1977 | Zachery | F01B 7/14 |
| | | | | 123/51 A |
| 4,398,507 | A * | 8/1983 | Belsanti | F01P 3/06 |
| | | | | 123/41.38 |
| 4,502,423 | A * | 3/1985 | Perry | F01M 1/06 |
| | | | | 123/196 AB |
| 5,072,654 | A * | 12/1991 | MacGregor | F02F 3/0069 |
| | | | | 123/197.3 |
| 5,174,249 | A * | 12/1992 | Katou | F01M 1/06 |
| | | | | 123/41.38 |
| 5,265,700 | A * | 11/1993 | Santi | F16C 9/04 |
| | | | | 123/197.4 |
| 6,120,189 | A * | 9/2000 | Beagle | F16C 11/02 |
| | | | | 384/255 |
| 6,571,684 | B1 * | 6/2003 | Nov | F16J 1/18 |
| | | | | 92/157 |
| 8,376,620 | B2 * | 2/2013 | Yamazaki | F16C 9/02 |
| | | | | 384/288 |
| 9,175,725 | B2 | 11/2015 | Dion et al. | |
| 2007/0227350 | A1 * | 10/2007 | Doers | F02F 3/20 |
| | | | | 92/208 |
| 2009/0151663 | A1 * | 6/2009 | Pastor Alvarez | F02B 75/1896 |
| | | | | 123/68 |
| 2009/0159022 | A1 * | 6/2009 | Chu | F02B 29/0406 |
| | | | | 123/52.2 |
| 2012/0247419 | A1 * | 10/2012 | Hofbauer | F02B 75/243 |
| | | | | 123/197.3 |
| 2012/0285418 | A1 | 11/2012 | Elsbett et al. | |
| 2014/0238360 | A1 * | 8/2014 | Dion | F16J 1/09 |
| | | | | 123/51 B |
| 2014/0299109 | A1 | 10/2014 | Fuqua et al. | |

\* cited by examiner

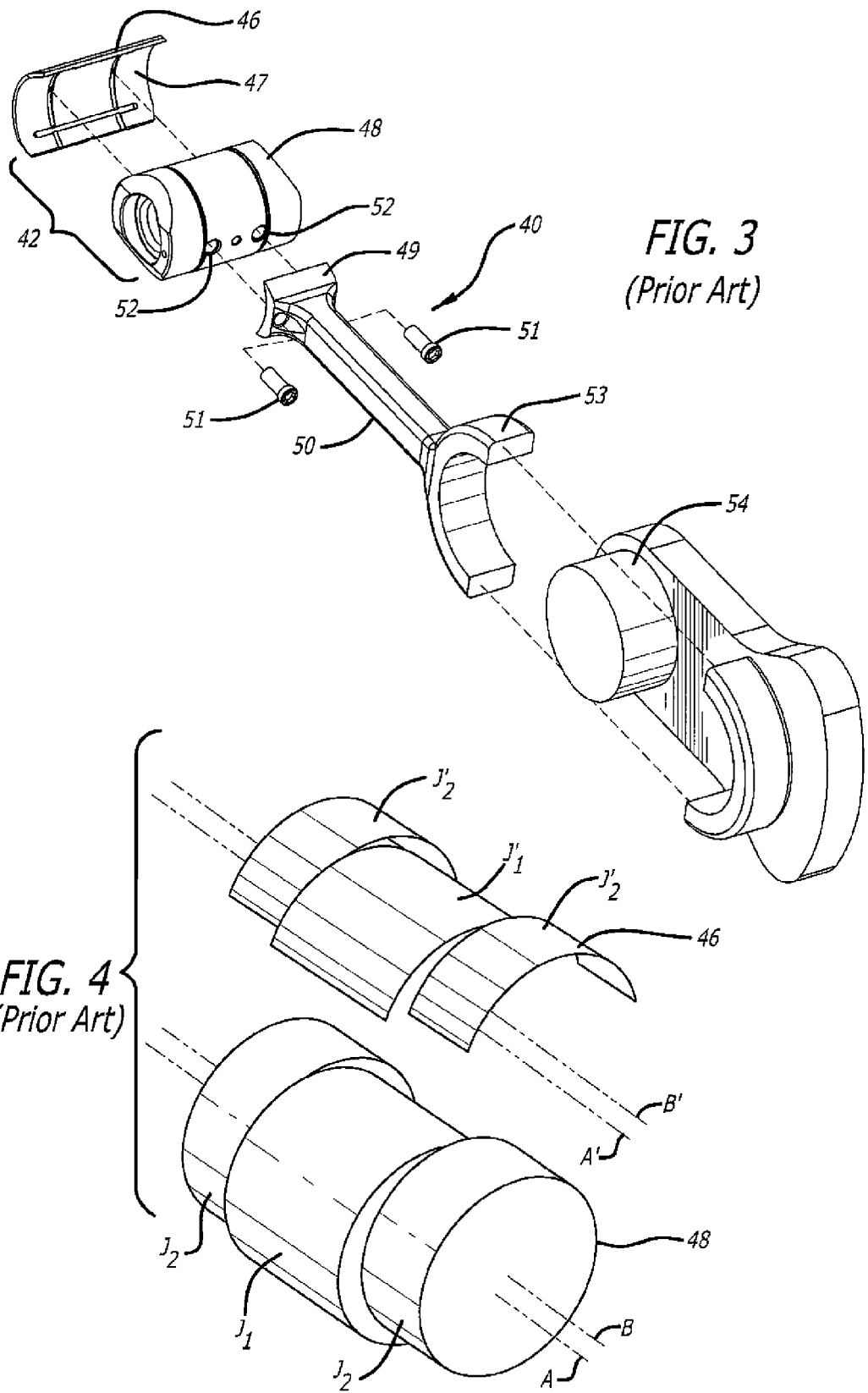

LOAD TRANSFER POINT OFFSET OF ROCKING JOURNAL WRISTPINS IN UNIFLOW-SCAVENGED, OPPOSED-PISTON ENGINES WITH PHASED CRANKSHAFTS

RELATED APPLICATIONS

This application contains subject matter related to the subject matter of commonly-owned U.S. patent application Ser. No. 13/776,656, filed Feb. 25, 2013, titled "Rocking Journal Bearings for Two-Stroke Cycle Engines", published as US 2014/0238360 A1 on Aug. 28, 2014.

FIELD OF THE DISCLOSURE

The field includes rocking-journal bearings for uniflow-scavenged, opposed-piston engines with phased crankshafts.

BACKGROUND OF THE DISCLOSURE

Construction of an opposed-piston engine is well understood. In FIG. 1, the engine 8 illustrates an example of a two-stroke cycle, opposed-piston engine. The engine 8 includes one or more cylinders such as the cylinder 10. The cylinder 10 is constituted of a liner (sometimes called a "sleeve") retained in a cylinder tunnel formed in a cylinder block. The liner includes a bore 12 and longitudinally displaced intake and exhaust ports 14 and 16, machined or formed in the liner near respective ends thereof. Each of the intake and exhaust ports includes one or more circumferential arrays of openings in which adjacent openings are separated by a solid portion of the cylinder wall (also called a "bridge"). In some descriptions, each opening is referred to as a "port"; however, the construction of a circumferential array of such "ports" is no different than the port constructions in FIG. 1.

One or more injection nozzles 17 are secured in threaded holes that open through the sidewall of the liner, between the intake and exhaust ports. Two pistons 20, 22 are disposed in the bore 12 of the cylinder liner with their end surfaces 20e, 22e in opposition to each other. For convenience, the piston 20 is referred to as the "intake" piston because of its proximity to, and control of, the intake port 14. Similarly, the piston 22 is referred to as the "exhaust" piston because of its proximity to, and control of, the exhaust port 16. The engine includes two rotatable crankshafts 30 and 32 that are disposed in a generally parallel relationship and positioned outside of respective intake and exhaust ends of the cylinder. The intake piston 20 is coupled to the crankshaft 30 (referred to as the "intake crankshaft"), which is disposed along an intake end of the engine 8 where cylinder intake ports are positioned; and, the exhaust piston 22 is coupled to the crankshaft 32 (referred to as the "exhaust crankshaft"), which is disposed along an exhaust end of the engine 8 where cylinder exhaust ports are positioned. In uniflow-scavenged, opposed-piston engines with a two or more cylinders, all exhaust pistons are coupled to the exhaust crankshaft and all intake pistons to the intake crankshaft.

Operation of an opposed-piston engine with one or more cylinders is well understood. Using the engine 8 as an example, each of the pistons 20, 22 reciprocates in the bore 12 between a bottom center (BC) position near a respective end of the liner 10 where the piston is at its outermost position with respect to the liner, and a top center (TC) position where the piston is at its innermost position with respect to the liner. At BC, the piston's end surface is positioned between a respective end of the cylinder, and its associated port, which opens the port for the passage of gas. As the piston moves away from BC, toward TC, the port is closed. During a compression stroke each piston moves into the bore 12, away from BC, toward its TC position. As the pistons approach their TC positions, air is compressed in a combustion chamber formed between the end surfaces of the pistons. Fuel is injected into the combustion chamber. In response to the pressure and temperature of the compressed air, the fuel ignites and combustion follows, driving the pistons apart in a power stroke. During a power stroke, the opposed pistons move away from their respective TC positions. While moving from TC, the pistons keep their associated ports closed until they approach their respective BC positions. In some instances, the pistons may move in phase so that the intake and exhaust ports 14, 16 open and close in unison. However, one piston may lead the other in phase, in which case the intake and exhaust ports have different opening and closing times.

One reason for introducing a phase difference in piston movements is to drive the process of uniflow scavenging in which pressurized charge air entering a cylinder through the intake port pushes the products of combustion (exhaust gas) out of the cylinder through the exhaust port. The replacement of exhaust gas by charge air in the cylinder is "scavenging." The scavenging process is uniflow because gas movement through the cylinder is in one direction: intake-to-exhaust. In order to optimize the uniflow scavenging process, the movement of the exhaust piston 22 is advanced with respect to the movement of the intake piston 20. In this respect, the exhaust piston is said to "lead" the intake piston. Such phasing causes the exhaust port 16 to begin to open before the intake port 14 opens and to begin closing before the intake port. Thus, exhaust gas flows out of the cylinder before inflow of pressurized charge air begins (this interval is referred to as "blow down"), and pressurized charge air continues to flow into the cylinder after the outflow of exhaust gas ceases. Between these events, both ports are open (this is when scavenging occurs). Scavenging ends when the exhaust port 16 closes. Now, having no exit, the charge air that continues to flow into the cylinder 10 between time of closure of the exhaust port 16 and the time of closure of the intake port 14 is caught in the cylinder 10, and is retained therein when the intake port 14 closes. This retained portion of charge air retained in the cylinder by the last port closure is referred to as "trapped air", and it is this trapped air that is compressed during the compression stroke.

Movement of the pistons in response to combustion is coupled to the crankshafts 30 and 32, which causes the crankshafts to rotate. The rotational position of a crankshaft with respect to a piston coupled to it is called the crank angle (CA). The crank angle is given as the angle from the position of the crankshaft to the centerline of the bore in which the piston moves; CA=0° when the piston is at TC. Presuming that the opposed-piston engine 8 is constructed for uniflow scavenging, a piston phase difference is established as per FIG. 2 by advancing the rotational position of the exhaust crankshaft 32 relative to the intake crankshaft 30 by some fixed amount, which is typically expressed as a "phase offset" in degrees of crankshaft rotation. This causes the exhaust piston 22 to lead the intake piston 20 by a corresponding amount throughout the operational cycle. During engine operation, the phase offset is maintained as the crankshafts rotate, and the crankshafts are said to be "phased." More broadly, the term "phased crankshafts" refers to the two crankshafts of an opposed-piston constructed as per FIG. 1, in which the rotational movement of one crankshaft leads the rotational movement of the other crankshaft by a fixed number of degrees throughout the cycle of engine operation.

In FIG. 1, the pistons 20 and 22 are connected to the crankshafts 30 and 32 by respective coupling mechanisms 40 including journal bearings 42. In some aspects of two-stroke cycle engine operation, due to the nature of the cycle, a load reversal on a journal bearing may never occur during the normal speed and load range operation of the engine; or, the duration of a load reversal might be relatively short. In these circumstances, it is difficult to replenish the bearings with oil. Furthermore, given limited angular oscillation of the bearing, oil introduced between the bearing surfaces does not completely fill the bearing. Eventually the bearing begins to operate in a boundary layer lubrication mode (also called "boundary lubrication mode"), which leads to excess friction, wear, and then bearing failure. Related U.S. patent application Ser. No. 13/776,656 describes and illustrates a solution to the problem of non-reversing compressive loads that includes a rocking wristpin bearing (also called a "biaxial bearing"), which is incorporated into the engine 8 of FIG. 1. In this regard, each coupling mechanism 40 of the engine 8 may be constructed in a manner described in the '656 patent application and illustrated in FIG. 3. Referring to FIGS. 1 and 3, a coupling mechanism 40 supports a piston 20 or 22 by means of a rocking journal bearing 42 including a bearing sleeve 46 having a bearing surface 47 and a wristpin 48. The sleeve 46 is fixed to internal structure of the piston by conventional means. The wristpin 48 is retained on the small end 49 of a connecting rod 50 by threaded fasteners 51 for rocking oscillation on the bearing surface of the sleeve. The large end 53 of the connecting rod 50 is secured to an associated crankpin 54 of a respective one of the crankshafts 30, 32 by conventional fasteners (not shown). This structure is preferred, but is not intended to be limiting or to exclude other structures in which the wristpin is fixed and the sleeve is retained on the connecting rod for rocking oscillation on the wristpin. In either case, relative rocking oscillation occurs between the wristpin 48 and sleeve 46.

As seen in FIG. 4, the wristpin 48 is a cylindrical piece that comprises a plurality of axially-spaced, eccentrically-disposed journal segments. A first journal segment $J_1$ comprises an annular bearing surface formed in an intermediate portion of the wristpin, between two journal segments $J_2$. The two journal segments $J_2$ comprise annular bearing surfaces formed at opposite ends of the wristpin, on respective sides of the journal segment $J_1$. The journal segment $J_1$ has a centerline A. The journal segments $J_2$ share a centerline B that is offset from the centerline A. As per FIG. 5, the centerlines A and B are offset by equal distances from each other on a line 60 that is orthogonal to the longitudinal axis 62 of the connecting rod 50. As seen in FIG. 4, the sleeve 46 is a semi-cylindrically shaped piece with a segmented bearing surface that includes a plurality of axially-spaced, eccentrically-disposed surface segments. A first surface segment $J_1'$ comprises an arcuately-shaped bearing surface formed in an intermediate portion of the wristpin, between two surface segments $J_2'$. The two surface segments $J_2'$ comprise arcuately-shaped bearing surfaces formed at opposite ends of the sleeve, on respective sides of the surface segment $J_1'$. The surface segment $J_1'$ has a centerline A'. The surface segments $J_2'$ share a centerline B' that is offset from the centerline A' of surface segment $J_1'$. As per FIG. 5, the centerlines A' and B' are offset by equal distances from each other on a line 60' that is orthogonal to the longitudinal axis 62 of the connecting rod 50. The wristpin 48 is mounted to the small end 49 of the connecting rod 50 and the sleeve 46 is mounted to an internal structure of the piston, with bearing surface sets $J_1$-$J_1'$ and $J_2$-$J_2'$ in opposition.

In operation, as the piston to which they are mounted reciprocates between TC and BC positions, oscillating rocking motion between the wristpin 48 and the sleeve 46 causes the bearing surface sets $J_1$-$J_1'$ and $J_2$-$J_2'$ to alternately receive the compressive load. The segments receiving the load come together and the segments being unloaded separate, which enables a film of oil to enter space between the separating segment surfaces. A "load transfer point" occurs during oscillation of the bearing when the bearing surface sets are equally loaded and the direction of oscillation is causing the load to be increasingly transferred from one bearing surface set to another. During one full cycle of the two-stroke engine, this point is traversed twice, once when the piston moves from TC to BC, and again when the piston moves from BC to TC. As per FIG. 5, with 0° angular offset between the crankshafts, the load transfer points of the pistons occur at or near crankshaft positions of 0° (when the pistons are at their respective TC locations) and 180° (when the pistons are at their respective BC locations).

It has been recognized that positioning the load transfer point is important in the operation of traditional two-stroke engines with continuous compressive loads that have a peak cyclic intensity. For example, U.S. Pat. No. 3,762,389 discloses positioning a load transfer point to occur following the cycle peak load point (which occurs just after the piston TC position) so as to avoid minimization of the oil film between the bearing surfaces. However, with a single crankshaft and a single piston in each cylinder, each rocking journal interface is configured to the same load transfer point at the same time in each cycle.

What the '389 patent fails to consider is that setting all piston rocking journals to the same load transfer point in a two-stroke cycle, opposed-piston engine, with the exhaust crankshaft leading the intake crankshaft, will cause the same wristpin segments in the exhaust pistons to transition to an increasing highly loaded state further into the cycle and then diminish in loading as the pistons approach BC. When compared with the intake wristpin segments, this shift in loading of the exhaust wristpin segments will result in a lower minimum oil film thickness (MOFT) on the wristpin segment ($J_1$ or $J_2$) affected during the power stroke and higher MOFT on the segment that is loaded during the compression stoke, which is an undesired effect in a rocking journal lubrication scheme.

SUMMARY OF THE DISCLOSURE

Load transfer point offset of rocking journal bearings in uniflow-scavenged, opposed-piston engines with phased crankshafts includes differing offsets for the load transfer points of intake and exhaust pistons. For example, under the condition that the exhaust crankshaft leads the intake crankshaft, an angular offset of the exhaust rocking journal wristpin proportional to an offset of the exhaust crankshaft relative to the intake crankshaft is made to ensure adequate oil film thickness to the interfaces of the bearing journal when it experiences a peak combustion pressure during the power stroke.

In some instances, the load transfer point offset is given effect by selecting an arcuate position of a rocking journal wristpin with respect to the small end of the piston connecting rod interface that offsets the load transfer point proportionally to a crankshaft lead. With this load transfer point offset, peak loading conditions on the wristpin will occur following TC, and before maximum load, of the piston during a full engine operating cycle. This offset of the load transfer point shifts the loading regimes of the rocking journal bearing to later in the crankshaft cycle so that adequate oil film thickness is provided to the loaded journal segments during power and compression strokes.

BRIEF DESCRIPTION OF THE DRAWINGS

FIG. 3 is an exploded perspective view of a piston coupling mechanism including a rocking journal bearing, and is properly labeled "Prior Art".

FIG. 4 is a schematic diagram illustrating the bearing surfaces of the rocking journal of FIG. 3, and is properly labeled "Prior Art".

DETAILED DESCRIPTION

Figure 1:
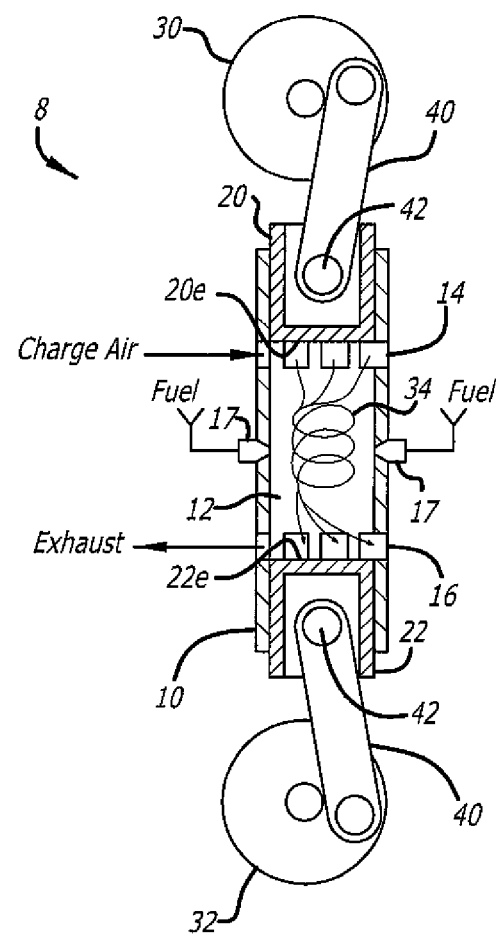
FIG. 1 is a schematic representation of a two-stroke cycle, opposed-piston engine, and is properly labeled "Prior Art".
Figure 2:
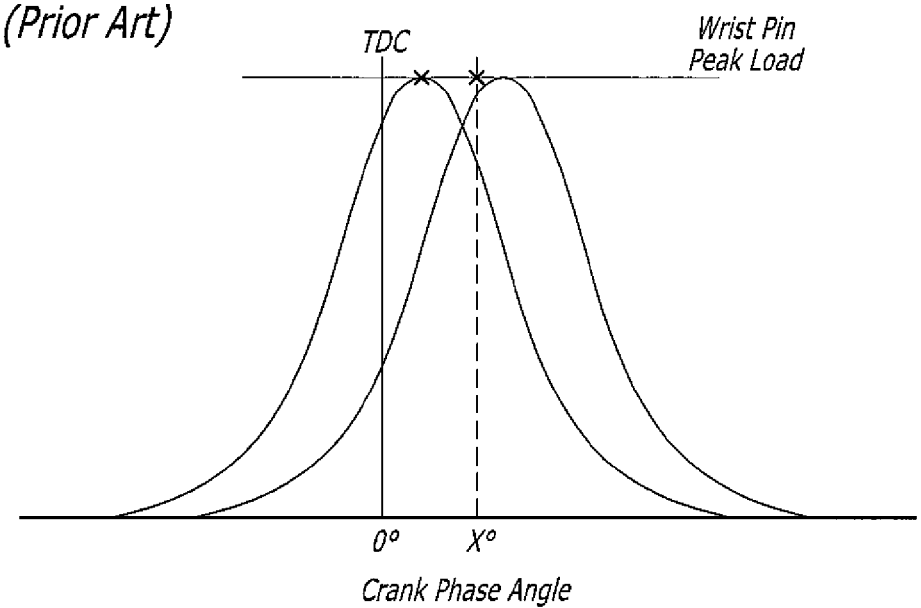
FIG. 2 is a graph showing a phase offset between two crankshafts of an opposed-piston engine, and is properly labeled "Prior Art".
Figure 6:
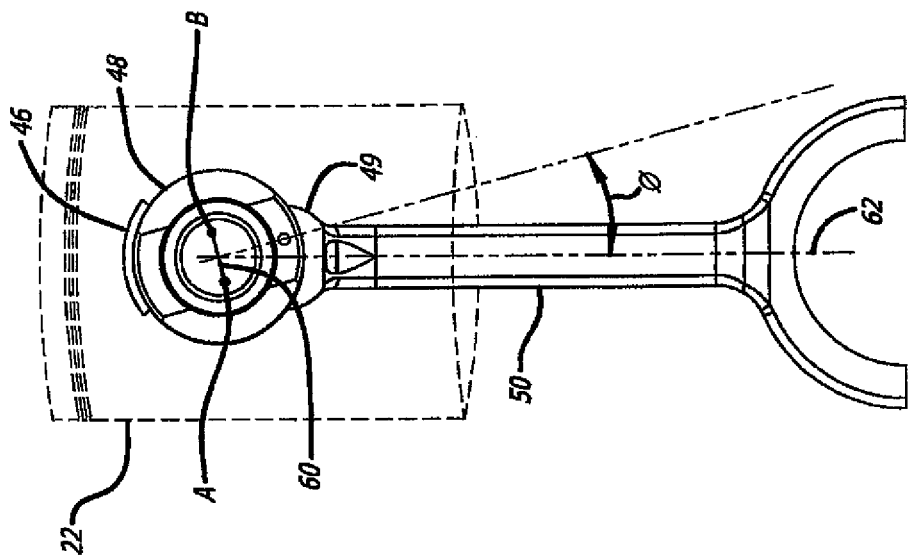
FIG. 6 is an illustration of a piston coupling mechanism comprising a rocking journal with a second load transfer point offset from the first load transfer point.
Figure 5:
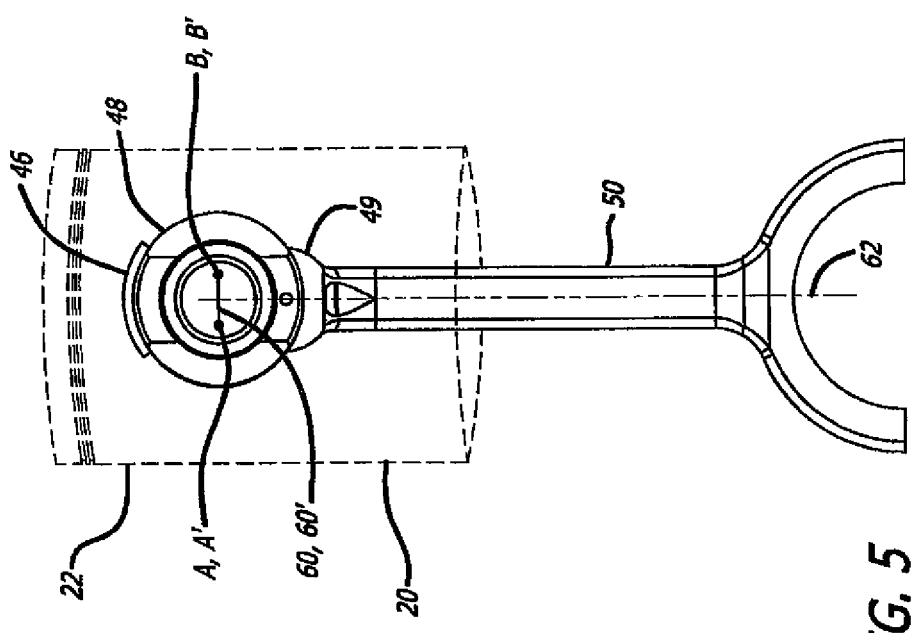
FIG. 5 is an illustration of a piston coupling mechanism comprising a rocking journal with a first load transfer point, and is properly labeled "Prior Art".

Fixed Crankshaft Phasing:

Presume that the piston coupling mechanisms for a pair of opposed exhaust and intake pistons of a uniflow-scavenged, opposed-piston engine according to FIG. 1 are assembled with rocking journal bearings as shown in FIG. 5. With 0° angular offset between the exhaust and intake crankshafts, the load transfer points of the exhaust and intake pistons occur approximately at crankshaft positions that are 180° apart (0° and 180°, for example). Presume now that the exhaust crankshaft is advanced in phase by a crank angle of x with respect to the intake crankshaft. In this case as per FIG. 6, a fixed angular offset $\phi$ is applied to the wristpin of the exhaust piston's rocking journal bearing, resulting in a delayed load transition point for the exhaust piston. In other words, the load transfer point of the exhaust rocking journal bearing is shifted by the angular offset $\phi$. In this regard, the offset $\phi$ is measured between the longitudinal axis of the coupling rod and the line 60 that joins the centerlines A and B of the wristpin. Thus, when the exhaust piston is at TC or at BC, the $J_1$-$J_2$ wristpin journal segments are rotated by $\phi$ with respect to the $J_1'$-$J_2'$ bearing surface segments. The offset may be put into effect, for example, by circumferential positioning of the threaded recesses 52 (best seen in FIG. 3) which receive the threaded fasteners 51. It should be evident that the CCW direction of the angular offset illustrated in FIG. 6 is not meant to be limiting.

Figures 7A, 7B:
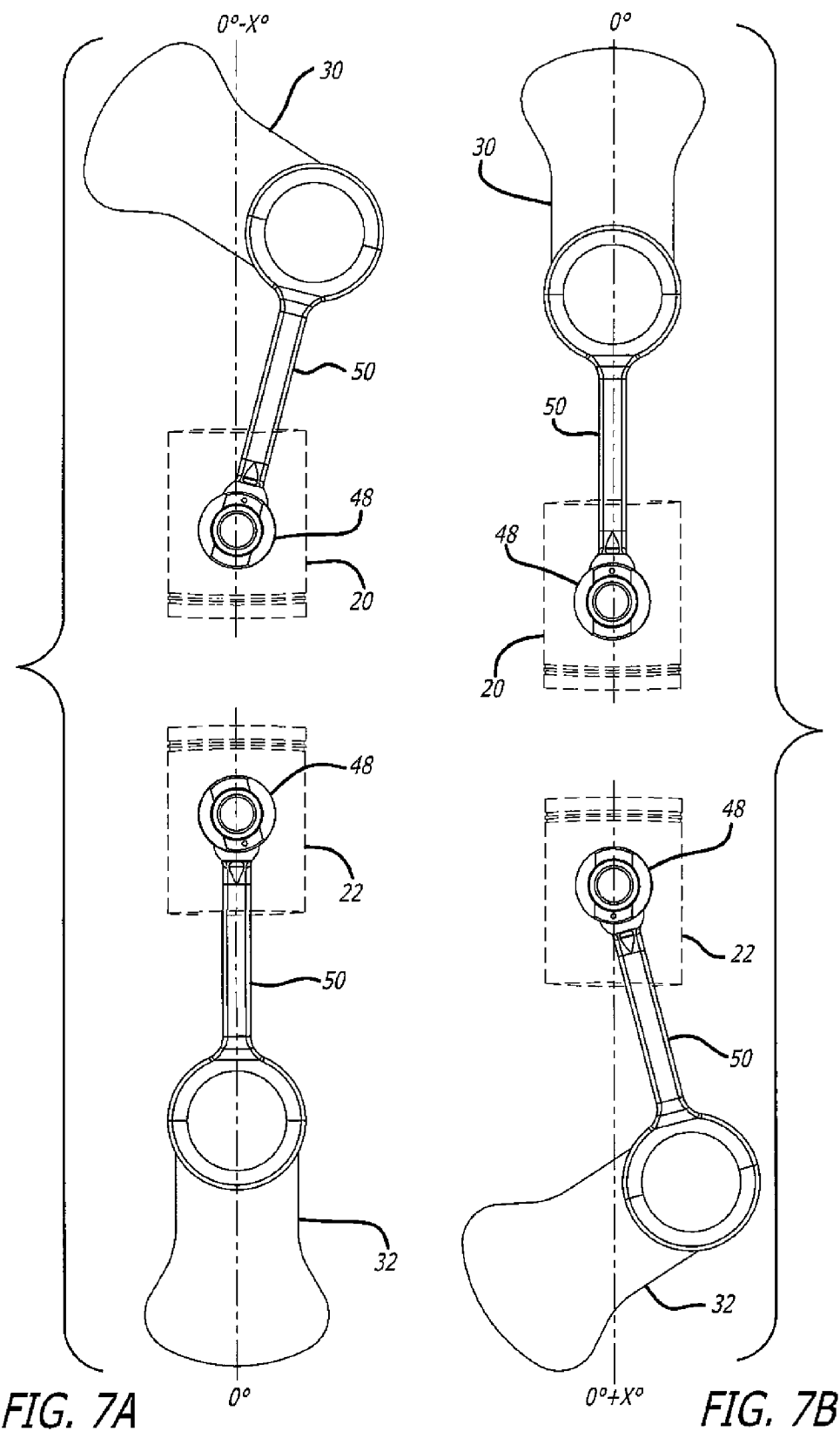
FIGS. 7A and 7B are schematic drawings showing relative positions of intake and exhaust piston coupling mechanisms at successive points in the engine operating cycle.
Figure 8:
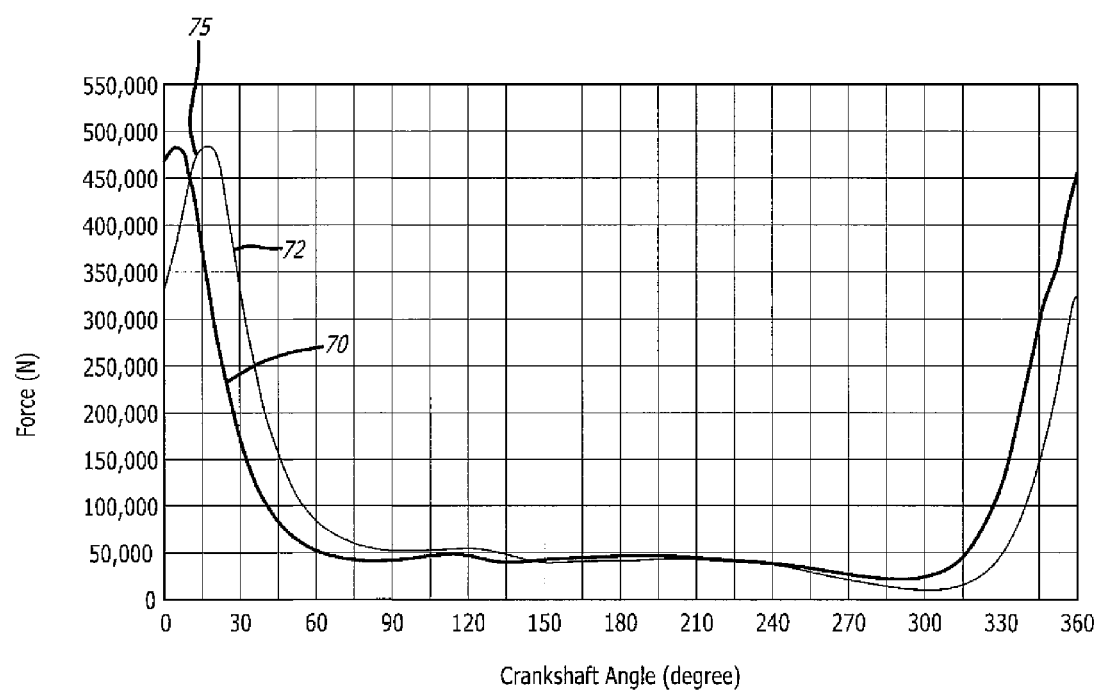
FIG. 8 is a graph showing forces acting on the intake and exhaust pistons of FIGS. 7A and 7B during the engine operating cycle.

The effect of applying the fixed angular offset $\phi$ to the wristpin of the exhaust piston's rocking journal bearing is illustrated in FIGS. 7A and 7B. In these figures, which merely illustrate principle of the angular offset and are not intended to be limiting, the view is from the rear toward the front of the engine and the crankshafts 30 and 32 are both rotating in a clockwise direction. When the exhaust crankshaft 32 is at CA=0°, the exhaust piston 22 is at TC and its wristpin has not yet rotated to the load transfer point. At this time, the intake crankshaft 30 is at CA=(0−x)° and the intake piston 20 is approaching TC and its wristpin has not yet rotated to the load transfer point. Then, when the exhaust crankshaft 32 has advanced to CA=(0+x)°, the exhaust piston 22 is leaving TC and its wristpin has rotated to the load transfer point. At this time, the intake crankshaft 30 is at CA=0° and the intake piston 20 is at TC and its wristpin has rotated to the load transfer point. Presuming combustion occurs a short time after the pistons have moved through their respective TC locations, the cylinder pressure, and the resulting load on the pistons, peaks at the transition from the compression stroke to the power stroke. FIG. 8 shows the desired result of applying a fixed angular offset $\phi$ to the wristpin of the exhaust piston's rocking journal bearing. The curve 70 shows combustion pressure acting against the end surface 20e of the intake piston 20 versus CA of the intake crankshaft 30; the curve 72 shows combustion pressure acting against the end surface 22e of the exhaust piston 22 versus CA of the exhaust crankshaft 32. Preferably, compressive load transfer from one set of opposed bearing segments to the other in each of the rocking journals occurs during each cycle closely preceding the occurrence of a cyclic peak load. With respect to the intake piston 20, this occurs at or very near CA=0° (when the intake piston is at or very near TC). With the exhaust piston leading, cyclic peak load occurs well after TC (CA=0°); thus, without an angular offset, the exhaust piston's load transfer point occurs well before the exhaust piston experiences cyclic peak load. With an angular offset according to this disclosure, the load transfer point of the exhaust piston occurs at 75 on the curve 72, which follows TC of the piston but precedes the occurrence of a cyclic peak load to the same degree as the intake piston.

EXAMPLE

Figure 9:
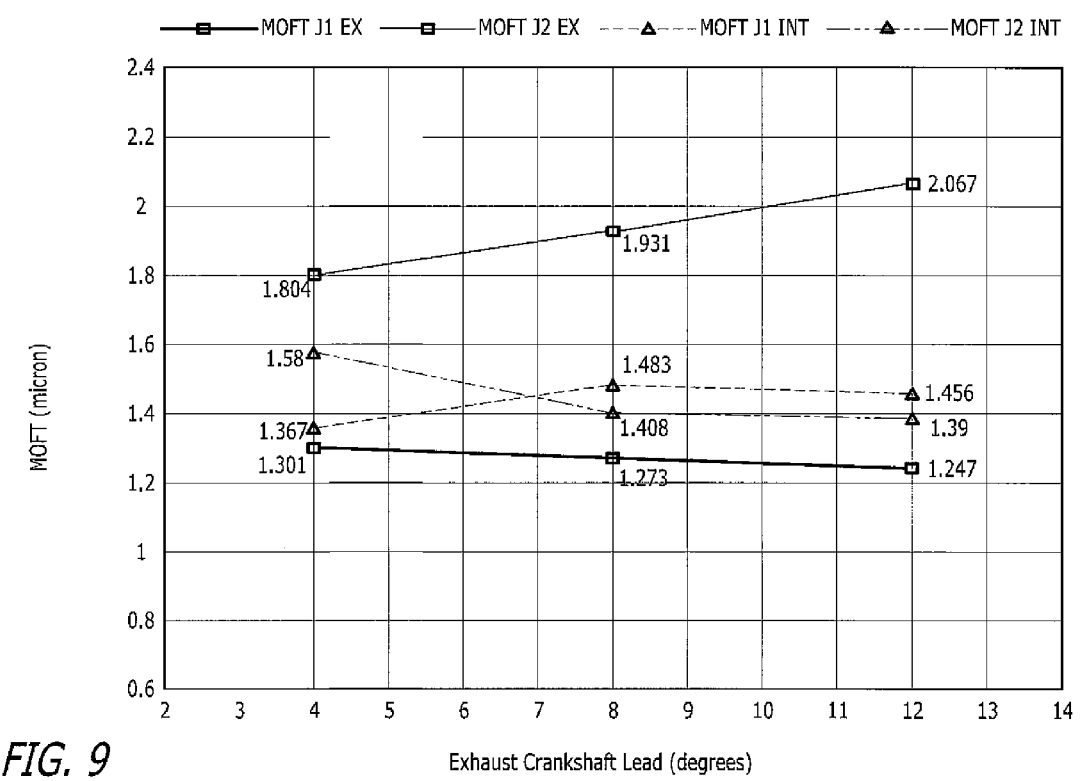
FIG. 9 is a graph showing values of minimum oil film thickness (MOFT) on bearing segments of intake and exhaust piston rocking journal wristpins for various exhaust crankshaft leads, with 0° load transfer point offsets to the bearings.
Figure 10:
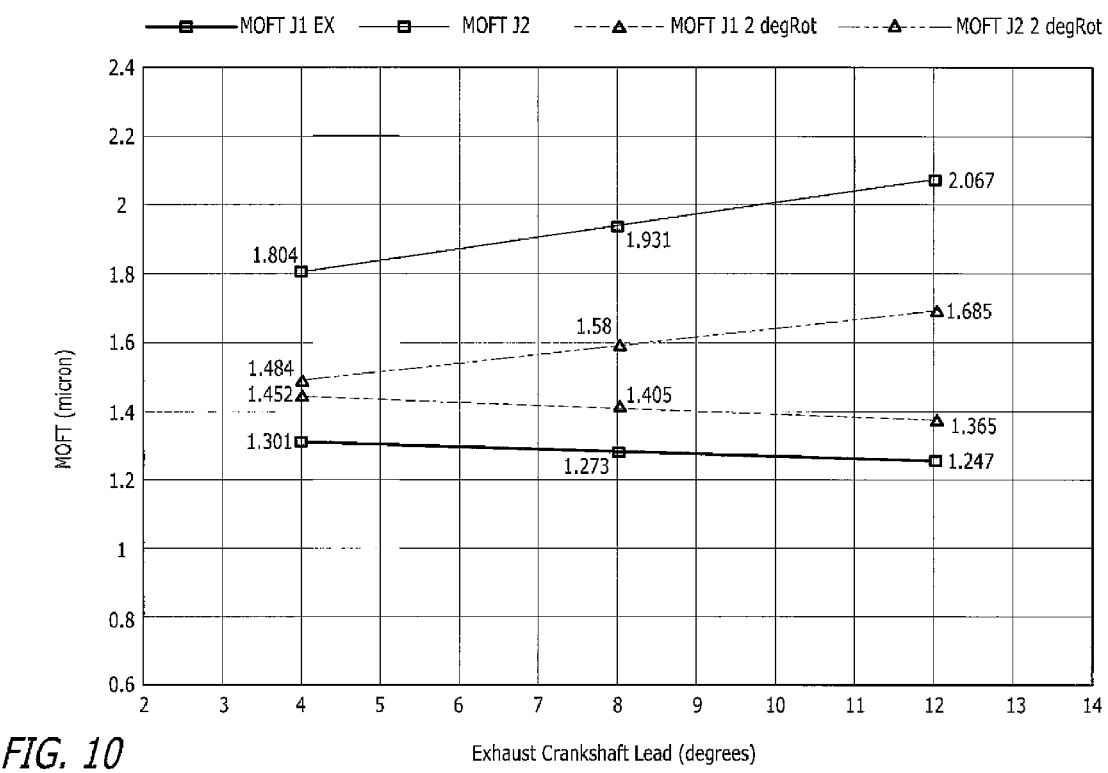
FIG. 10 is a graph showing values of MOFT on bearing segments of exhaust piston rocking journal wristpins for various exhaust crankshaft leads, with 0° and 2° load transfer point offsets to the bearings.
Figure 11:
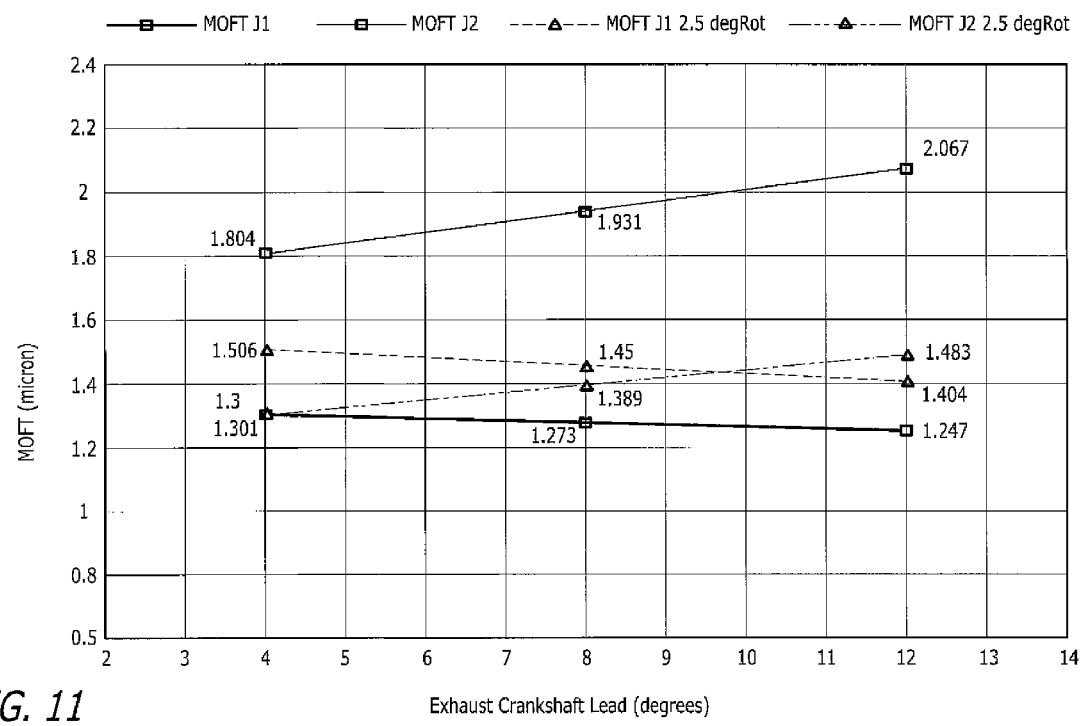
FIG. 11 is a graph showing values of MOFT on bearing segments of exhaust piston rocking journal wristpins for various exhaust crankshaft leads, with 0° and 2.5° load transfer point offsets to the bearings.

Presuming that engine specifications indicate a preferred phase difference x between exhaust and intake crankshafts, a preferred angular offset $\phi$ may be determined empirically, for example by means of a rocking-journal specific, mass conserving finite element model. According to this example, the phase difference is a fixed value in the range $4° \leq x \leq 12°$; that is to say that the exhaust crankshaft 32 leads the intake crankshaft 30 by x. FIGS. 9-11 illustrate this example, showing how the MOFT may be impacted on the $J_1$ and $J_2$ journal segments on intake piston wristpins (MOFT $J_1$ INT and MOFT $J_2$ INT) and exhaust piston wristpins (MOFT $J_1$ EX and MOFT $J_2$ EX) as exhaust crankshaft lead is varied in this range. In this example, which is not intended to be limiting, the intake and exhaust piston rocking journals are assembled so as to have the $J_1$ segments loaded during the power stroke, while the $J_2$ segments are loaded during the compression stroke.

As shown in FIG. 9, for an intake piston rocking bearing journal at 4° exhaust crankshaft lead, the $J_1$ journal segment has approximately 0.2 μm less MOFT than the $J_2$ segments. This is because the transition between journal segments occurs close to TC. At 4° exhaust crankshaft lead, the intake piston peak cylinder pressure occurs further in the cycle than at the higher exhaust crankshaft leads. The $J_2$ segments transition and carry the load from BC at low load until close to TC. The load transfer then occurs to the $J_1$ segment which sees an initial high load and increasing loading until peak cylinder pressure (PCP). At higher exhaust crankshaft leads the intake piston peak loads occur earlier in the cycle, closer to the transition point. The $J_2$ segments carry the load closer to the PCP, resulting in decreased MOFT and the $J_1$ segment accepts the load at a point closer to PCP resulting in increased MOFT. At 12° exhaust crankshaft lead the $J_2$ segments experience the highest peak loads and have the lowest MOFT's and the $J_1$ transition occurs very close to PCP causing high initial squeeze and a slightly lower MOFT than at 8 degrees exhaust crankshaft lead. Overall the intake piston pin MOFT on $J_1$ and $J_2$ journals is sufficient and reasonably balanced throughout the range of exhaust crankshaft leads desired for testing. Manipulation of the wristpin initial radial position to alter the transition point is not required or beneficial for the intake piston.

As is shown in FIG. 9 the MOFT on the exhaust piston wristpin is not well balanced. As exhaust crankshaft lead is increased, MOFT on the $J_1$ and $J_2$ segments diverges. Unlike the intake piston in which PCP occurs earlier in the cycle, as exhaust crankshaft lead is increased the exhaust piston PCP occurs later in the cycle. The exhaust $J_2$ segments experience decreasing peak load with increased exhaust crankshaft lead and the $J_1$ segment transitions into a longer positive loading ramp until PCP as the exhaust crankshaft lead increases. The result of the varying load regimes is an increasing MOFT on the $J_2$ segments and a decreasing MOFT on the $J_1$ segment for the exhaust piston wristpin. In order to enhance the MOFT for the $J_1$ segment and more evenly balance the MOFT between the $J_1$ and $J_2$ segments on the exhaust piston wristpin, a fixed angular offset is applied to the wristpin, resulting in a delayed transition point forcing the $J_2$ segments to accept higher load resulting in lower MOFT and the $J_1$ segment to have a shorter increasing pressure ramp resulting in a higher MOFT.

The effect of applying a 2° initial piston wristpin angular offset on the exhaust piston pin is shown in FIG. 10. As shown in the figure, the effects of applying a 2° initial angular rotation to the exhaust piston wristpin are a higher MOFT on the $J_1$ segment and a lower MOFT on the $J_2$ segments across the exhaust crankshaft lead range. With the 2° angular offset on the exhaust piston wristpin the $J_1$ and $J_2$ segments MOFT is well balanced at 4° exhaust crankshaft lead, and MOFT diverges as the exhaust crankshaft lead increases. The effect of a larger exhaust piston wristpin initial angular position of 2.5° exhaust crankshaft leads is shown in FIG. 11. Increasing the angular offset on the exhaust piston pin from 2° to 2.5° results in a more balanced MOFT at 8° and 12° exhaust crankshaft lead but a slightly lower overall minimum MOFT on the $J_2$ segments at 4° lead. Further increases to the load point transfer offset of the exhaust piston pin would result in diminishing the $J_2$ segments MOFT further, which is undesirable. As the example of FIGS. 9-11 suggests, there is an optimal initial offset of the load transfer point of the exhaust piston wristpin; specifically, the example suggests that the optimal value lies between 2° and 2.5° for exhaust crank leads of 4° through 12°. Of course the ranges and values used in this example may be illustrative, they should not be considered to be limiting.

Variable Crankshaft Phasing:

In some aspects of dual-crankshaft operation, it may be desirable to equip an opposed-piston engine for dynamically variable crankshaft phasing. In this regard, see, for example, commonly-owned U.S. application Ser. No. 13/858,943, filed Apr. 8, 2013, for "Dual Crankshaft, Opposed-Piston Engines With Variable Crank Phasing", which has been published as US 2014/0299109 A1 on Oct. 9, 2014. For example, the crank angle of one of the crankshafts may be dynamically positioned or changed with respect to the other crankshaft in order to optimize engine performance in response to variable engine conditions such as engine speed, engine load, charge air flow, charge air composition, or, possibly, other engine conditions. In such instances, the load transfer point of the first rocking journal bearing may be selected so as to be effective over a range of crankshaft lead, for example the range of 4° to 12° illustrated in FIGS. 9-11. In such a case, the angular offset of the wristpin will remain fixed at some CA selected according to design and performance requirements within some range of crankshaft lead. Accordingly, the angular offset of the rocking journal elements (the wristpin, for example) can be applied to either fixed crankshaft phasing or dynamic crankshaft phasing over a prescribed CA range.

Although this disclosure describes particular embodiments for load transfer point offset of rocking journal wristpins in opposed-piston engines with phased crankshafts, these embodiments are set forth merely as examples of underlying principles of this disclosure. Thus, the embodiments are not to be considered in any limiting sense.

The invention claimed is:

1. A uniflow-scavenged, opposed-piston engine having first and second rotatable crankshafts, one or more cylinders each with a first piston interconnected by a first connecting rod with the first crankshaft and a second piston opposing the first piston and interconnected by a second connecting rod with the second crankshaft, a first rocking journal bearing situated between the first piston and the first connecting rod and including a plurality of sets of bearing surfaces, a second rocking journal bearing situated between the second piston and the second connecting rod and including a plurality of sets of opposed bearing surfaces, each rocking journal bearing having a respective load transfer point at which a compressive load transfer occurs from one set of opposed bearing surfaces to another set of opposed bearing surfaces during successive cycles of engine operation, wherein:

the first crankshaft is positioned so as to lead the second crankshaft during engine operation by an angle;

the load transfer point of the first rocking journal bearing being selected such that a load transfer from one set of opposed bearing surfaces to another set of opposed bearing surfaces occurs during each cycle following a top center position of the first piston and closely preceding the occurrence of a cyclic peak load; and, the load transfer point of the second rocking journal bearing being selected such that a load transfer from one set of opposed bearing surfaces to the another set of opposed bearing surfaces occurs during each cycle closely preceding the occurrence of the cyclic peak load;

wherein, the plurality of sets of bearing surfaces of the first rocking journal includes a plurality of axially-spaced, eccentrically-disposed journal segments formed on a wristpin and a plurality of corresponding axially-spaced, eccentrically-disposed surface segments formed on a segmented bearing surface of a sleeve, and when the first piston is at a top center or a bottom center the wristpin journal segments are rotated by an angular offset φ with respect to the bearing surface segments, in which a first wristpin rocking journal segment has a centerline A and second wristpin rocking journal segments share a centerline B that is offset from the centerline A, and the angular offset φ is measured between a longitudinal axis of the first connecting rod and a line that joins the centerlines A and B.

2. The uniflow-scavenged, opposed-piston engine according to claim 1, wherein the angle by which the first crankshaft leads the second crankshaft has a value x in the range of 4°<x<12°.

3. The uniflow-scavenged, opposed-piston engine according to claim 2, wherein the angular offset φ has a value in the range of 2°<φ<4°.

4. The uniflow-scavenged, opposed-piston engine according to claim 3, wherein the wristpin is mounted to a small end of the first connecting rod for rocking oscillation against the segmented bearing surface of the sleeve.

5. The uniflow-scavenging, opposed-piston engine according to claim 1, wherein the angle is fixed or variable.

6. The uniflow-scavenging, opposed-piston engine according to claim 5, wherein the first crankshaft is an exhaust crankshaft and the second crankshaft is an intake crankshaft.

7. A method of operating the uniflow-scavenging, opposed-piston engine according to claim 1, by:
causing the first and second crankshafts to rotate in response to combustion in a combustion chamber formed in the uniflow-scavenging, opposed-piston engine between end surfaces of the first and second pistons;
causing rotation of the first crankshaft to lead rotation of the second crankshaft;
causing the load transfer point of the first rocking journal to occur at a first crank angle measured with respect to rotation of the first crankshaft; and,
causing the load transfer point of the second rocking journal to occur at a second crank angle measured with respect to rotation of the second crankshaft;
wherein the first crank angle is greater than the second crank angle.

8. A two-stroke cycle, opposed-piston engine having first and second rotatable crankshafts a cylinder, a first piston disposed in a bore of the cylinder and interconnected by a connecting rod with the first crankshaft, a second piston disposed in the bore in opposition to the first piston and interconnected by a connecting rod with the second crankshaft, a first rocking journal bearing acting between the first piston and its connecting rod and including a plurality of sets of bearing surfaces, a second rocking journal bearing acting between the second piston and its connecting rod and including a plurality of sets of opposed bearing surfaces, each rocking journal bearing having a respective load transfer point at which a compressive load transfer occurs from one set of opposed bearing surfaces to another set of opposed bearing surfaces during successive cycles of engine operation, wherein:
the first crankshaft is positioned so as to lead the second crankshaft during engine operation by a fixed or variable angle;
the load transfer point of the first rocking journal bearing being selected such that a load transfer from one set of opposed bearing surfaces to another set of opposed bearing surfaces occurs during each cycle after a top center position of the first piston and preceding the occurrence of a cyclic peak load; and,
the load transfer point of the second rocking journal bearing being selected such that a load transfer from one set of opposed bearing surfaces to another set of opposed bearing surfaces occurs during each cycle preceding the occurrence of the cyclic peak load;
wherein, the plurality of sets of bearing surfaces of the first rocking journal includes a plurality of axially-spaced, eccentrically-disposed journal segments formed on a wristpin and a plurality of corresponding axially-spaced, eccentrically-disposed surface segments formed on a segmented bearing surface of a sleeve, and when the first piston is at a top center or a bottom center the wristpin journal segments are rotated by an angular offset φ with respect to the bearing surface segments, in which a first wristpin rocking journal segment has a centerline A and second wristpin rocking journal segments share a centerline B that is offset from the centerline A, and the angular offset φ is measured between a longitudinal axis of the first connecting rod and a line that joins the centerlines A and B.

9. The two-stroke cycle, opposed-piston engine according to claim 8, wherein the fixed or variable angle by which the first crankshaft leads the second crankshaft has a value x in the range of 4°<x<12°.

10. The two-stroke cycle, opposed-piston engine according to claim 8, wherein angular offset φ has a value in the range of 2°<φ<4°.

11. The two-stroke cycle, opposed-piston engine according to claim 10, wherein the wristpin is mounted to a small end of the first connecting rod for rocking oscillation against the segmented surface of the sleeve.

12. The two-stroke cycle, opposed-piston engine according to claim 11, wherein the first crankshaft is an exhaust crankshaft and the second crankshaft is an intake crankshaft.

13. A method of operating a two-stroke cycle, opposed-piston engine according to claim 8, by:
causing the first and second crankshafts to rotate in response to combustion in a combustion chamber formed in the uniflow-scavenging, opposed-piston engine between end surfaces of the first and second pistons;
causing rotation of the first crankshaft to lead rotation of the second crankshaft; causing the load transfer point of the first rocking journal to occur at a first crank angle measured with respect to rotation of the first crankshaft; and,
causing the load transfer point of the second rocking journal to occur at a second crank angle measured with respect to rotation of the second crankshaft;
wherein the first crank angle is greater than the second crank angle.

* * * * *

UNITED STATES PATENT AND TRADEMARK OFFICE
CERTIFICATE OF CORRECTION

PATENT NO. : 9,841,049 B2
APPLICATION NO. : 14/732588
DATED : December 12, 2017
INVENTOR(S) : Clark A. Klyza Page 1 of 1

It is certified that error appears in the above-identified patent and that said Letters Patent is hereby corrected as shown below:

In the Specification

Column 1, Line 12, delete "Aug. 28, 2014." and replace with "Aug. 28, 2014, now U.S. Pat. No. 9,175,725."

Column 3, Line 18, delete "application Ser. No. 13/776,656" and replace with "number 9,175,725"

Column 3, Line 24, delete "'656 patent application" and replace with "'725 patent"

In the Claims

Column 9, Claim 2, Line 21, delete "4°< x < 12°" and replace with "4°≤ x ≤12°"

Column 10, Claim 9, Line 36, delete "4°< x< 12°" and replace with "4°≤ x ≤ 12°"

Signed and Sealed this
Twenty-seventh Day of March, 2018

Andrei Iancu
*Director of the United States Patent and Trademark Office*